United States Patent
Matsumoto et al.

(10) Patent No.: US 6,794,036 B2
(45) Date of Patent: Sep. 21, 2004

(54) ACTIVE MATERIAL OF POSITIVE ELECTRODE FOR NON-AQUEOUS ELECTROLYTE SECONDARY BATTERY AND METHOD FOR PREPARING THE SAME AND NON-AQUEOUS ELECTROLYTE SECONDARY BATTERY USING THE SAME

(75) Inventors: Kazutoshi Matsumoto, Matsudo (JP); Tomio Tujimura, Ichikawa (JP); Kazuyuki Takeishi, Ichikawa (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 0 days.

(21) Appl. No.: 10/641,121

(22) Filed: Aug. 15, 2003

(65) Prior Publication Data
US 2004/0053135 A1 Mar. 18, 2004

Related U.S. Application Data (62) Division of application No. 09/646,959, filed as application No. PCT/JP99/01124 on Mar. 9, 1999, now Pat. No. 6,617,073.

(30) Foreign Application Priority Data

Mar. 23, 1998 (JP) .............................. 10-94119

(51) Int. Cl.$^7$ ............................... B32B 5/16
(52) U.S. Cl. ................ 428/402; 428/403; 428/407; 429/218.1; 429/231.1; 429/231.3; 429/231.95
(58) Field of Search ................... 428/402, 403, 428/407; 429/218.1, 231.1, 231.3, 231.95

(56) References Cited

U.S. PATENT DOCUMENTS

| | | | | |
|---|---|---|---|---|
| 5,503,930 A | * | 4/1996 | Maruyama et al. | 428/402 |
| 5,654,114 A | * | 8/1997 | Kubota et al. | 429/338 |
| 6,255,020 B1 | * | 7/2001 | Yamashita et al. | 429/231.95 |
| 6,617,073 B1 | * | 9/2003 | Matsumoto et al. | 429/231.3 |
| 6,638,988 B2 | * | 10/2003 | Takata et al. | 521/143 |

\* cited by examiner

*Primary Examiner*—Leszek Kiliman
(74) *Attorney, Agent, or Firm*—Dykema Gossett PLLC (57) ABSTRACT

In an active material of a positive electrode for a non-aqueous electrolyte secondary battery where lithium cobaltate represented by the formula $LiCoO_2$ is used, which comprises a mixture of primary particles of small crystals falling in the range of 0.4 to 10 $\mu$m in Feret's diameter in a projection chart by SEM observation and having an average diameter of 5 $\mu$m or less and secondary particles formed by gathering of a number of said small crystals and having an average particle size falling in the range of 4 to 30 $\mu$m where the molar ratio of Co to Li is 0.97 or more to 1.03 or less, at least part of the small crystals constituting the secondary particles are jointed by sintering and furthermore, the secondary particles are preferably spherical or elliptical.

5 Claims, 2 Drawing Sheets

ACTIVE MATERIAL OF POSITIVE ELECTRODE FOR NON-AQUEOUS ELECTROLYTE SECONDARY BATTERY AND METHOD FOR PREPARING THE SAME AND NON-AQUEOUS ELECTROLYTE SECONDARY BATTERY USING THE SAME

CROSS-REFERENCE TO RELATED APPLICATION

This application is a divisional of application Ser. No. 09/646,959, filed Sep. 25, 2000 now U.S. Pat. No. 6,617,073, which was a U.S. national phase of PCT/JP99/01124, filed Mar. 9, 1999. All priorities are claimed.

TECHNICAL FIELD

The present invention relates to an active material of a positive electrode for a non-aqueous electrolyte secondary battery where lithium metal, lithium alloys, and the like are used for a negative electrode. The invention particularly relates to an active material of a positive electrode for a non-aqueous electrolyte secondary battery which is improved particularly in discharge capacity, high-efficiency discharge capacity and a maintaining rate in discharge capacity and a maintaining rate in discharge capacity of the battery. The invention also relates to a process for preparing the same and a non-aqueous electrolyte secondary battery where the noted active material of a positive electrode is used.

BACKGROUND OF THE INVENTION

With the spread of portable apparatus such as portable telephones, note-sized personal computers, and so forth, the development of secondary batteries which have high energy density, are small-sized and lightweight, and have high capacity is strongly expected in recent years. As such batteries, there is a lithium ion secondary battery where lithium, lithium alloys, or carbon is used as a negative electrode and the research and development thereof is intensively carried out.

A lithium ion secondary battery where lithium-cobalt double oxide ($LiCoO_2$) is used as an active material of a positive electrode provides a high voltage of a 4-V level and therefore, is expected as a battery having a high energy density, and put to practical use.

Latest requirements for further high capacity and high power come to need to take measures to increase the packing density of the active material of a positive electrode or to decrease the amount of an electrically conductive substance such as carbon mixed with the active material of a positive electrode, which substantially increases the amount of the active material of a positive electrode.

In general, $LiCO_2$ is prepared by mixing certain amounts of a lithium salt, for example, such as lithium carbonate and a cobalt compound, for example, such as cobalt carbonate and calcining at temperatures of 600° C. to 1100° C. (Japanese Patent Laid-Open No. 304664/1989) or by mixing certain amounts of lithium carbonate and tricobalt tetraoxide having an average particle size of 2 to 25 μm and calcining at temperatures of 800° C. to 900° C. (Japanese Patent Laid-Open No. 283144/1997.

However, conventional $LiCoO_2$ has the disadvantages in that the packing density thereof is not increased or decrease in an amount of an electrically conductive substance leads to deterioration in discharge capacity and dependence on discharging current density.

The present inventors have come to think that this cause consists in the following. That is, $LiCoO_2$ has a hexagonal crystal lattice and therefore crystals grow in the direction of a right angle to the C axes in synthesis to form a plate crystals. In addition, the crystals are not uniform in size and therefore mixing with an electrically conductive substance and so forth produces a number of voids, failing to raise the packing density. Furthermore, the cause for deteriorating discharge capacity or high-efficiency discharge capacity by reducing the amount of the electrically conductive substance is thought as follows. In crystals formed according to conventional processes, sintering proceeds in high-temperature calcinations, which needs strong power to pulverize the product in the production of electrodes. The pulverization produces finely divided particles to enlarge the specific areas and consequently, a large amount of an electrically conductive substance such as carbon to be added is required in order to provide electrical conductivity.

Furthermore, marked reduction in packing properties or dropping off from a current collector is found when an active material is further finely divided in order to improve highly efficient discharging characteristics to allow the flow of high power.

DISCLOSURE OF THE INVENTION

An object of the invention is to solve the problems of the aforesaid conventional active materials of positive electrodes and to provide an active material of a positive electrode for a non-aqueous electrolyte secondary battery which is excellent in discharge capacity, high-efficiency discharge capacity and a maintaining rate in discharge capacity and a process for preparing the same and a non-aqueous electrolyte secondary battery where the active material of a positive electrode is used.

In order to solve the aforesaid problems, the inventors have further intensively studied the size and shape of primary particles of an active material of a positive electrode and the size and shape of secondary particles formed by gathering of the primary particles, and found that the control of these factors makes it possible to obtain an active material of a positive electrode which has a high capacity and a good high-efficiency discharge capacity, thus accomplishing the present invention.

That is, the first embodiment of the invention is characterized by an active material of a positive electrode for a non-aqueous electrolyte secondary battery wherein in the active material of a positive electrode for a non-aqueous electrolyte secondary battery where lithium cobaltate represented by the formula $LiCoO_2$ is used, the aforesaid lithium cobaltate is composed of a mixture of primary particles of small crystals which fall in the range of 0.4 to 10 μm in Feret's diameter in a projection chart by SEM observation and are 5 ∞m or less in average particle size and secondary particles formed by gathering of the small crystals which fall in the range of 4 to 30 μm and in addition, the molar ratio of Co to Li is 0.97 or more and 1.03 or less. In addition, it is preferable that at least part of the small crystals constituting the aforesaid secondary particles are mutually jointed by sintering and furthermore, the aforesaid secondary particles are spherical or elliptically spherical.

Furthermore, the first embodiment of the invention is characterized by an active material of a positive electrode for a non-aqueous electrolyte secondary battery wherein the secondary particles account for 90 percent or more of particles of 9 μm or more in Feret's diameter in a projection chart by SEM observation and the volume ratio of particles of 6 μm or more in Feret's diameter in a projection chart by SEM observation is 70 percent or more in the total mixture.

The second embodiment of the invention is characterized by a process for preparing the active material of a positive electrode for a non-aqueous electrolyte secondary battery wherein in the process for preparing the active material of a positive electrode for a non-aqueous electrolyte secondary battery where lithium cobaltate represented by the formula $LiCoO_2$ is used, the aforesaid lithium cobaltate composed of the mixture of the primary particles of small crystals which fall in the range of 0.4 to 10 μm in Feret's diameter in a projection chart by SEM observation and have an average diameter in 5 or less μm and the secondary particles which are formed by gathering of a number of the aforesaid small crystals and fall in the range of 4 to 30 μm where the molar ratio of Co to Li is 0.97 or more and 1.03 or less is obtained by mixing a lithium salt and a cobalt source where cobalt oxyhydroxide (CoOOH) is used as a raw material and comprises secondary particles falling in the range of 4 to 30 μm and formed by gathering of a number of primary particles of 0.2 to 0.8 μm and subsequently, by carrying out heat treating this mixture. In addition, it is preferable that the secondary particles of the aforesaid active material of a positive electrode are spherical or elliptically spherical and at least part of the small crystals constituting the secondary particles of the aforesaid active material of a positive electrode are mutually jointed.

The secondary particles of the aforesaid cobalt oxyhydroxide are spherical or elliptically spherical and account for 90 percent or more of particles of 9 μm or more in Feret's diameter in a projection chart by SEM observation and the volume ratio of particles of 6 μm or more is 70 percent or more of the total mixture. The heat treatment of the aforesaid mixture is carried out at an oxidative atmosphere at 800° C. to 1000° C. for 4 to 12 hours. It is preferred to use as the cobalt source tricobalt tetraoxide obtained by heat treating the oxyhydroxide at 350° C. to 800° C. in an oxidative atmosphere or tricobalt tetraoxide comprising secondary particles which fall in the range of 4 to 30 μm and are formed by gathering of a number of primary particles falling in the range of 0.05 to 0.8 μm in Feret's diameter in a projection chart by SEM observation.

In addition, the second embodiment of the invention is characterized by a process for preparing the active material of a positive electrode for a non-aqueous electrolyte secondary battery wherein the second particles of the aforesaid tricobalt tetraoxide are spherical or elliptically spherical.

The third embodiment of the invention is characterized by the non-aqueous electrolyte secondary battery containing as a constituent the active material of a positive electrode relating to the first embodiment.

BEST MODE FOR CARRYING OUT THE INVENTION

In the active material of a positive electrode for a non-aqueous electrolyte secondary battery relating to the invention, the contact area of the active material of a positive electrode with an electrolyte can be enlarged to acquire good dependence on discharging current density by using small crystals falling in the range of 0.4 to 10 μm in Feret's diameter in a projection chart by a SEM (scanning electron microscope) observation and having an average particle size of 5 μm or less as the primary particles for lithium cobaltate represented by the formula $LiCoO_2$.

The term "Feret's diameter in a projection chart" used in the invention means the maximum length in the projection chart (particularly, in the measurement of elliptical sphere, the length of the longest direction). The reason for restricting the size to the range of 0.4 to 10 μm is that the size less than 0.4 μm causes reduction in discharge capacity and high-efficiency discharge capacity and on the other hand, exceeding 10 μm results in reducing a maintaining rate in discharge capacity. Furthermore, the reason for restricting the average particle size to 5 μm or less is that exceeding 5 μm causes reduction in first-time discharge capacity and the maintaining rate in capacity and therefore, it is necessary to be 5 μm or less. The production of the small crystals falling in the range of 0.4 to 10 μm in Feret's diameter and having an average particle size of 0.5 μm or less is however difficult and accordingly, the lower limit is 0.5 μm.

Although the primary particles themselves of the aforesaid small crystals are fine particles, at least part of the primary particles are mutually jointed by sintering to form spherical or elliptically spherical secondary particles having a particle size falling in the range of 4 to 30 μm, which forms the active material of a positive electrode comprising a mixture with the aforesaid primary particles. This leads to improvement in electric conductivity and at the same time, mixing of the primary particles of small crystals with the secondary particles makes it possible to fill voids produced among the secondary particles with the primary particles of small crystals to increase packing density. Marked improvement in packing properties of the active material of a positive electrode in an electrode is possible and dropping-off from a current collector also can be protected, which leads to increase in discharge capacity and improvement in a maintaining rate in discharge capacity.

The reason for restricting the particle size of the secondary particles to 4 to 30 μm is that the size less than 4 μm causes reduction in high-efficiency discharge capacity and on the other hand, exceeding 30 μm results in lowering first-time discharge capacity and a maintaining rate in capacity. It is necessary that the molar ratio of Co to Li in lithium cobaltate represented by the formula $LiCoO_2$ is 0.97 or more and 1.03 or less. The reason for this is that the molar ratio less than 0.97 or exceeding 1.03 causes reduction in first-time discharge capacity, a maintaining rate in capacity and dependence on discharging current density.

In the active material of a positive electrode for a non-aqueous electrolyte secondary battery, it is preferred that the secondary particles account for 90 percent or more of particles of 9 μm or more in Feret's diameter in a projection chart by SEM observation and the volume ratio (volume fraction) of particles of 9 μm or more in said Feret's diameter is 70 percent or more of the total mixture. The reason for this is that when the ratio of the secondary particles in particles of 9 μm or more in Feret's diameter in the projection chart is less than 90 percent, repeated charging and discharging produces finely divided particles from large primary particles to cut off electric contact or drop off from a current collector, which deteriorates the maintaining rate in capacity. Furthermore, when the volume ratio of particles of 6 μm or more in Feret's diameter in the projection chart is less than 70 percent of the mixture, the necessary amount of an electrically conductive substance such as acetylene black added to provide electric conductivity increases to cause reduction in discharge capacity or deterioration in high-efficiency discharge capacity. When the amount of the electrically conductive substance is increased in order to improve the electrical conductivity, the amount of the active material of a positive electrode with which a battery can be filled decreases to cause reduction in electric capacity of the battery.

Subsequently, the process for producing the active material of a positive electrode for a non-aqueous electrolyte secondary battery is illustrated. Lithium cobaltate represented by the formula $LiCoO_2$ having the aforesaid composition is prepared by mixing a lithium salt such as lithium carbonate and a cobalt source where cobalt oxyhydroxide (CoOOH) comprising spherical or elliptically spherical secondary particles falling in the range of 4 to 30 μm and formed by gathering a number of primary particles of 0.2 to 0.8 μm as a raw material and then heat treating the mixture.

The reason for restricting the secondary particles formed by gathering cobalt oxyhydroxide to the range of 4 to 30 μm is that lithium cobaltate having the desired sizes of secondary particles cannot be obtained on the outside of the range.

The heat treatment of the aforesaid mixture is preferably carried out in an oxidative atmosphere at 800° C. to 1000° C. for 4 to 12 hours. The reason for restricting the conditions of the heat treatment to 800° C. to 1000° C. and 4 to 12 hours is that the heat treatment less than 800° C. ° C. or less than 4 hours or the heat treatment exceeding 1000° C. or exceeding 12 hours fail to acquire sufficiently all of first-time discharge capacity, a maintaining rate in discharge capacity and high-efficiency discharge capacity.

Furthermore, tricobalt tetraoxide prepared by heat treating the oxyhydroxide in an oxidative atmosphere at 350° C. to 800° C. or tricobalt tetraoxide or tricobalt tetraoxide comprising secondary particles which fall in the range of 4 to 30 μm and are formed by gathering a number of primary particles in the range of 0.05 to 0.8 μm in Feret's diameter in a projection chart is preferably used as the cobalt source. The shape of the aforesaid secondary particles of tricobalt tetraoxide is restricted to sphere or elliptic sphere.

The reason for restricting the shape of the secondary particles to sphere or elliptic sphere is that a sufficient tap density cannot be provided and the high-efficiency discharge capacity also deteriorates by uncertain shapes other than the shapes.

In addition to lithium carbonate, lithium hydroxide, lithium nitrate, and the like can be used as the aforesaid lithium salt.

EXAMPLES

Example 1

Figure 1:
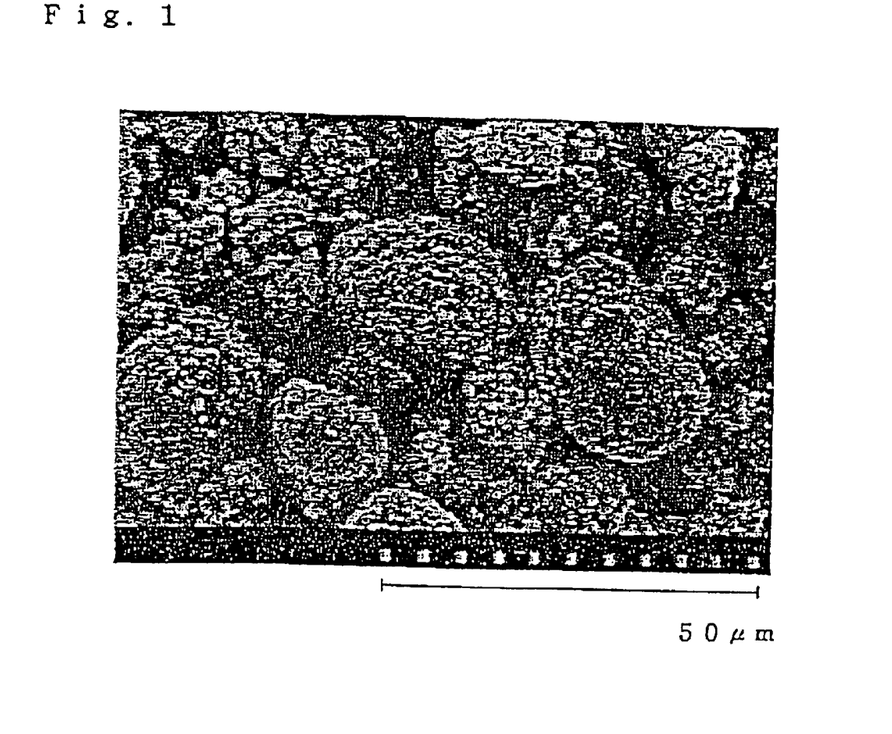
FIG. 1 is a view showing the particle structure of spherical cobalt oxyhydroxide used in Example 1 through a scanning electron microscope.

Cobalt oxyhydroxide (CoOOH) forming the secondary particles of sphere or elliptic sphere as principal shapes which fall in the range of 4 to 30 μm and are formed by gathering a number of primary particles of 0.2 to 0.8 μm as shown in a SEM photograph of FIG. 1 and lithium carbonate ($Li_2CO_3$) were precisely weighed so that the molar ratio of Li and Co had compositions as shown in the following Table 1, mixed and granulated with a stainless steel mixing granulator equipped with stirring blades and an agitator while adding an aqueous solution of polyvinyl alcohol resin (PVA) so that the amount of PVA became about 1.4 weight parts to 100 weight parts of powder.

Subsequently, the aforesaid mixture granulated to 3 to 5 mm was dried at 120° C. for 5 hours and then calcined under the respective conditions as shown in Table 1.

The compositions of the resulting lithium cobaltate were analyzed by use of a inductively coupled plasma atomic spectrometer (ICP) and did not almost change from the charge composition as shown in Table 1, respectively. In the identification of formed phases by powder X-ray diffraction by use of the Kα ray of Cu, only traces of the phases of $Li_2CO_3$ and $Co_3O_4$ were detected as other phases than $LiCoO_2$ of JCPDS File No. 16-427.

Figure 2:
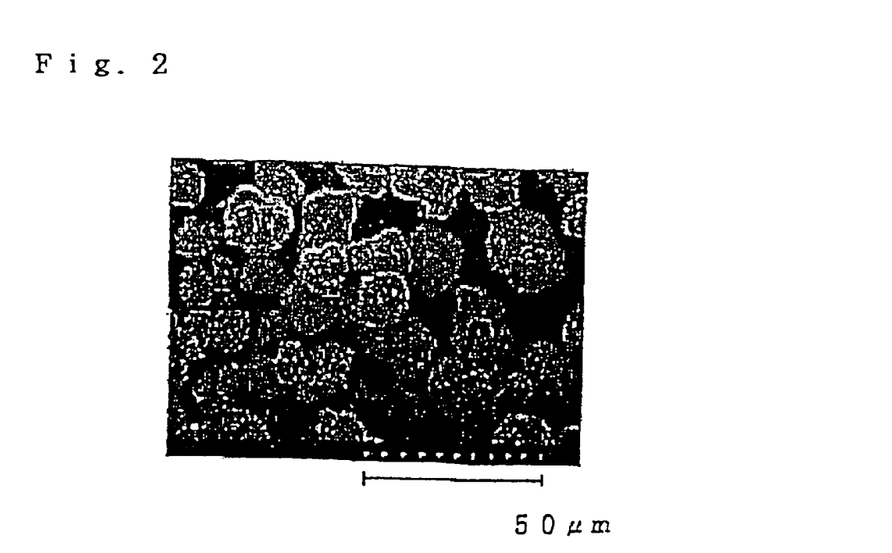
FIG. 2 is a view showing the particle structure of spherical lithium cobaltate obtained in Example 2 through a scanning electron microscope.

The resulting lithium cobaltate were controlled in size through a screen of 32-μm opening and SEM observation was carried out. As a result, it was ascertained to be a mixture of small particles falling in the range of 0.4 to 10 μm in Feret's diameter in the projection chart and having an average particle size of 5 μm or less and spherical or elliptically spherical secondary particles formed by gathering of a number of the aforesaid small particles and falling in the range of 4 to 30 μm as may be seen from FIG. 2.

Subsequently, observation by a SEM at ×15,000 magnification confirmed that part of the primary particles constituting the secondary particles were mutually jointed by sintering. Furthermore, about particles of 9 μm or more in Feret's diameter in a projection chart of the aforesaid mixtures, the ratio of the secondary particles and the primary particles was examined on a SEM photograph of ×600 magnification and it was found that all the secondary particles accounted for 98 percent or more.

Furthermore, the particle size distribution of the aforesaid mixtures was examined with a microtrack particle size distribution measuring apparatus and the cumulative volume percentage of particles of 6 μm or more in Feret's diameter in the projection chart each was found to be 90 percent or more.

A certain amount (50 grams) of the lithium cobaltate controlled in particle size as described above was placed in a measuring cylinder of 100-$cm^3$ capacity and dropping of the measuring cylinder onto a rubber plate having a hardness of 60 to 80 from a height of 50 cm were repeated 200 times for tapping. After the tapping was complete, the volume of the sample in the measuring cylinder was read to calculate tap density, which is shown in Table 1.

Furthermore, batteries were assembled by use of the resulting lithium cobaltate as an active material to measure the charging and discharging capacity. The active material of a positive electrode of the aforesaid lithium cobaltate, acetylene black and polytetrafluoroethylene resin (PTFE) were mixed in a weight ratio of 80:15:5 to prepare a depolarizing mix and 50 mg of the aforesaid depolarizing mix was weighed out and press molded at a pressure of 200 MPa into a disk of 10-mmφ diameter.

Figure 3:
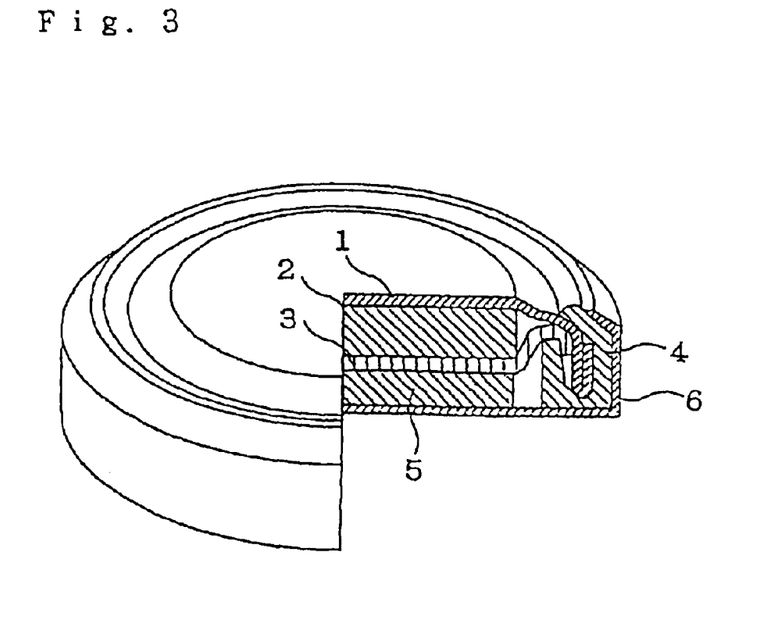
FIG. 3 is an oblique view partly lacked of a 2032-type coin type battery where an active material of a positive electrode obtained in the invention is used.

The resulting disk was dried in a vacuum dryer at 120° C. overnight to prepare a positive electrode. And positive electrode pellet 5 and Li metal pellet 2 of 16-mmφ diameter and 1-mm thickness for a negative electrode were used as shown in FIG. 3, and a mixture solution containing ethylene carbonate (EC) and 1,2-dimethoxyethane (DME) in the same amount and 1 mole of $LiPF_6$ as a supporting salt was used as an electrolyte. Polyethylene porous film of 25-μm thickness was used for separator 3 and sealed with gasket 4. A 2032-type coin type battery was assembled in an atmosphere of Ar in a glove box controlled to a dew point of −80° C.

In FIG. 3, 1 is a negative electrode can, 6 is a positive electrode can and the electrolyte is present in voids of the interior of the battery though it is not shown in the figure.

The coin type batteries thus assembled were allowed to stand for about 10 hours after assembling. After an open circuit voltage (OCV) was stabilized, the batteries were charged at a charging current density of 1.0 mA/cm² until a cut-off voltage of 4.3 V, then allowed to stand for 2 hours, and a discharging test was carried out at a discharging current density of 1.0 mA/cm² until 3.0 V. The results of discharge capacity are shown in Table 1.

Charging and discharging tests were repeated under the same conditions as described above and the maintaining rate in discharge capacity was calculated according to the following equation 1 after the tests were repeated 100 times.

Maintaining Rate in Discharge Capacity (%)=100-time Discharge Capacity/First-time Discharge Capacity×100    Equation 1

TABLE 1

| Run No. | Li/Co (Molar Ratio) | Calcining Temperature (° C.)/hours | Atmosphere | Tap Density g/cm³ | First-time Discharge Capacity mAh/g | Maintaining Rate in Capacity (%) |
|---|---|---|---|---|---|---|
| 1 | 0.97 | 1000/4 | Air | 2.65 | 151 | 80 |
| 2 | 1.00 | 900/8 | Air | 2.63 | 150 | 84 |
| 3 | 1.03 | 800/12 | Air | 2.70 | 147 | 81 |
| 4 | 1.01 | 900/6 | Air | 2.71 | 150 | 82 |
| 5 | 1.00 | 900/8 | Air | 2.69 | 152 | 83 |
| 6 | 1.02 | 850/8 | Oxygen | 2.68 | 145 | 80 |
| 7 | 0.99 | 900/10 | Air | 2.70 | 144 | 81 |
| 8 | 0.98 | 950/8 | Air | 2.65 | 143 | 81 |
| 9 | 1.00 | 950/6 | Air | 2.70 | 149 | 84 |
| 10 | 1.00 | 900/8 | Oxygen | 2.69 | 152 | 93 |

Example 2

Lithium cobaltate was obtained with the compositions of cobalt oxyhydroxide and lithium carbonate used in Example 1 under the calcining conditions as shown in Table 2 in a manner similar to Example 1. The resulting lithium cobaltate was evaluated in a manner similar to Example 1. The composition thereof did not almost change from the charge composition shown in Table 2 and formed phases were not confirmed as phases other than $LiCoO_2$ except that only traces of $Li_2Co_3$ and $Co_3O_4$ phases were detected.

The lithium cobaltate was ascertained to be a mixture of small crystals falling in the range of 0.4 to 10 μm in Feret's diameter in the projection chart and having an average particle size of 5 μm or less and spherical or elliptically spherical secondary particles formed by gathering a number of the aforesaid small crystals and falling in the range of 4 to 30 μm. Furthermore, it was confirmed that part of the primary particles constituting the secondary particles were mutually jointed by sintering. It also was confirmed that in the aforesaid mixture, the volume ratio of particles of 6 μm or more in Feret's diameter in the projection chart was 90 percent or more of the mixture and in addition, the secondary particles accounted for 98 percent or more of particles of 9 μm or more in Feret's diameter in the projection chart.

Similarly to Example 1, batteries as shown in FIG. 3 were assembled by use of the resulting lithium cobaltate as an active material of a positive electrode. The high-efficiency discharge capacity of the resulting coin type batteries was evaluated from dependence on discharging current density as follows.

That is, the aforesaid coin type batteries were allowed to stand for 10 hours after assembling. After OCV was stabilized, the batteries were charged at a charging current density of 1.0 mA/cm² until a cut-off voltage of 4.3 V and then allowed to stand for 2 hours and a discharging test was carried out at a discharging current density of 1.0 mA/cm² until a cut-off voltage of 3.0 V to find discharge capacity (1). Furthermore, after standing for 2 hours after the discharging test was complete, the batteries were charged again at a charging current density of 1.0 mA/cm² until a cut-off voltage of 4.3 V and then allowed to stand for 2 hours, and a discharging test was carried out at a discharging current density of 8.0 mA/cm² until a cut-off voltage of 3.0 V to find discharge capacity (8). The dependence on discharging current density was calculated according to the following equation 2. Results are shown together in Table 2.

Dependence on Discharging Current Density=Discharge Capacity (8)/Discharge Capacity (1)×100    Equation 2

TABLE 2

| Run No. | Li/Co (Molar Ratio) | Calcining Temperature (° C.)/hours | Atmosphere | Dependence on Discharging Current Density (%) |
|---|---|---|---|---|
| 11 | 0.97 | 980/5 | Air | 62 |
| 12 | 1.00 | 900/8 | Air | 68 |
| 13 | 1.03 | 850/12 | Air | 61 |
| 14 | 1.00 | 900/6 | Oxygen | 67 |
| 15 | 1.00 | 950/8 | Air | 70 |

Example 3

About the respective samples having numbers shown in Table 3 of the lithium cobaltate obtained in Example 1, part thereof was pulverized to 6 μm or less with a centrifugal grinder. The resulting ground powders were mixed in an appropriate amount with the original samples so that the volume fraction (volume ratio) of particles of 6 μm or more in mixed powders was as shown in Table 3, thus to obtain the mixed powders. The tap densities of the resulting mixed powders were examined similarly to Example 1, which are shown in Table 3.

Coin type batteries as shown in FIG. 3 were prepared by use of the aforesaid mixed powders as active materials of positive electrodes in a manner similar to Example 1. The first-time discharge capacity and the maintaining rates in the 100-time discharge capacity are shown together in Table 3.

TABLE 3

| Run No. | Number in Example 1 | Volume Fraction of Particles of 6 μm or More (%) | Tap Density g/cm³ | First-time Discharge Capacity mAh/g | Maintaining Rate in Capacity (%) |
|---|---|---|---|---|---|
| 16 | 1 | 90 | 2.74 | 151 | 80 |
| 17 | 2 | 80 | 2.80 | 150 | 84 |
| 18 | 3 | 90 | 2.75 | 147 | 81 |
| 19 | 5 | 70 | 2.85 | 152 | 83 |
| 20 | 8 | 85 | 2.80 | 149 | 84 |
| 21 | 10 | 95 | 2.76 | 152 | 83 |

Example 4

About the respective samples having numbers shown in Table 4 of the lithium cobaltate obtained in Example 1, parts thereof were re-calcined in an electric furnace at 1000° C. for 24 hours while allowing air to pass through. In the re-calcined products, growth of the primary particles proceeded and a number of particles having particle sizes of 9 μm or more were contained. After pulverizing these with a centrifugal grinder, particles of 9 μm or more and 30 μm or less were collected with sieves to obtain coarse primary particles. The aforesaid coarse primary particles obtained so that the volume fractions of the secondary particles became as shown in Table 4 about particles of 9 μm or more in mixed powders were mixed in an appropriate amount with the original samples to obtain the mixed powders. The packing densities of the resulting mixed powders were examined similarly to Example 1, which are shown in Table 4.

Coin type batteries as shown in FIG. 3 were produced by use of the aforesaid mixed powders as active materials of positive electrodes in a manner similar to Example 1. The first-time discharge capacity and the maintaining rates in the 100-time discharge capacity are shown together in Table 4.

TABLE 4

| Run No. | Number in Example 1 | Volume Fraction of Secondary Particle (%) | Tap Density g/cm³ | First-time Discharge Capacity mAh/g | Maintaining Rate in Capacity (%) |
| --- | --- | --- | --- | --- | --- |
| 22 | 2 | 95 | 2.62 | 149 | 83 |
| 23 | 3 | 97 | 2.68 | 146 | 82 |
| 24 | 4 | 94 | 2.68 | 148 | 81 |
| 25 | 10 | 90 | 2.65 | 147 | 80 |

Example 5

Figure 4:
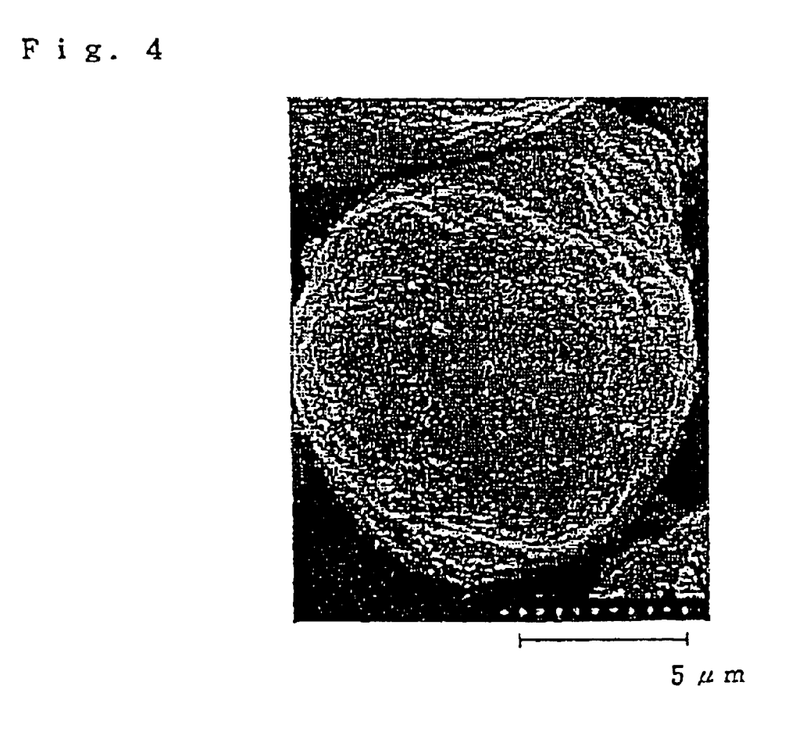
FIG. 4 is a view showing the particle structure of spherical tricobalt tetraoxide used in Example 5 through a scanning electron microscope.

The cobalt oxyhydroxide (CoOOH) used in Example 1 was calcined at conditions as shown in Table 5 to obtain tricobalt tetraoxide ($Co_3O_4$). All of the resulting $Co_3O_4$ were secondary particles having sphere or elliptical sphere falling in the range of 4 to 30 μm as main forms of particles and formed by gathering of a number of primary particles of 0.2 to 0.8 μm in Feret's diameter in the projection charts by SEM observation as shown in FIG. 4.

Lithium cobaltate was obtained by use of the resulting $Co_3O_4$ as cobalt sources with the compositions and conditions as shown in Table 5 in a manner similar to Example 1. The resulting lithium cobaltate was evaluated in a manner similar to Example 1. The compositions did not almost changed from the charge compositions as shown in Table 5. Formed phases were not observed except that only traces of phases of $Li_2Co_3$ and $Co_3O_4$ were detected as other phases than that of $LiCoO_2$.

The Lithium cobaltate was ascertained to be a mixture small crystals falling in the range of 0.4 to 10 μm in Feret's diameter in the projection chart and having an average particle size of 5 μm or less and secondary particles formed by gathering of a number of the aforesaid small crystals and falling in the range of 4 to 30 μm.

Furthermore, it was confirmed that in the primary particles constituting the secondary particles, part thereof were jointed by sintering. In the aforesaid mixture, the volume ratio of particles of 6 μm or more in Feret's diameter in the projection chart to the mixture was ascertained to be 90 percent or more. In addition, 98 percent or more of particles of 9 μm or more in Feret's diameter in the projection chart was ascertained to be the secondary particles.

Subsequently, the tap density was examined in a manner similar to Example 1, which is shown in Table 5.

Coin type batteries as shown in FIG. 3 were prepared by use of the resulting lithium-cobalt double oxide as an active material in a manner similar to Example 1 to measure the discharge capacity. Results are shown together in Table 5.

TABLE 5

| Run No. | CoOOH Calcining Temperature (° C.) | Li/Co (Molar Ratio) | Calcining Temperature (° C.)/ hours | Atmosphere | Tap Density g/cm³ | First-time Discharge Capacity mAh/g | Maintaining Rate in Capacity (%) |
| --- | --- | --- | --- | --- | --- | --- | --- |
| 26 | 350 | 1.00 | 900/4 | Air | 2.64 | 145 | 80 |
| 27 | 500 | 1.00 | 900/8 | Air | 2.68 | 150 | 81 |
| 28 | 800 | 1.03 | 900/8 | Air | 2.66 | 146 | 80 |
| 29 | 700 | 0.97 | 900/6 | Air | 2.65 | 150 | 82 |
| 30 | 400 | 1.00 | 900/8 | Air | 2.70 | 152 | 84 |
| 31 | 500 | 1.00 | 850/12 | Oxygen | 2.67 | 147 | 80 |
| 32 | 450 | 1.00 | 950/6 | Air | 2.68 | 151 | 83 |
| 33 | 600 | 1.00 | 950/6 | Oxygen | 2.70 | 151 | 82 |
| 34 | 750 | 1.00 | 1000/4 | Air | 2.66 | 152 | 80 |
| 35 | 450 | 1.00 | 950/6 | Oxygen | 2.69 | 150 | 94 |

Example 6

About the respective samples having numbers shown in Table 6 of the lithium cobaltate obtained in Example 5, part thereof were pulverized through a centrifugal grinder to 6 μm or less. Ground particles obtained so that the volume fraction of particles of 6 μm or more in mixed powder became as shown in Table 6 were mixed in appropriate amounts with the original samples to obtain the mixed powders. The tap densities of the resulting mixed powders were examined similarly to Example 1, which are shown in Table 6.

Coin type batteries as shown in FIG. 3 were produced by use of the aforesaid mixed powders as the active materials of positive electrodes in a manner similar to Example 1. The first-time discharge capacity and the maintaining rates in the 100-time discharge capacity are shown together in Table 6.

TABLE 6

| Run No. | Number of Example 5 | Volume Fraction of Particles of 6 μm or More (%) | Tap Density g/cm³ | First-time Discharge Capacity mAh/g | Maintaining Rate in Capacity (%) |
| --- | --- | --- | --- | --- | --- |
| 36 | 26 | 70 | 2.85 | 153 | 84 |
| 37 | 27 | 80 | 2.83 | 152 | 81 |
| 38 | 28 | 90 | 2.75 | 149 | 80 |
| 39 | 32 | 70 | 2.88 | 154 | 82 |
| 40 | 33 | 85 | 2.83 | 152 | 93 |
| 41 | 35 | 95 | 2.72 | 151 | 84 |

Example 7

About the respective samples having numbers shown in Table 7 of the lithium cobaltate obtained in Example 5, part thereof were re-calcined in an electric furnace at 1000° C. for 24 hours while allowing air to pass through. In the resulting re-calcined products, growth of the primary particles proceeded and a number of particles having particle sizes of 9 μm or more were contained. After these were pulverized with a centrifugal grinder, particles of 9 μm or more and 30 μm or less were collected with sieves to obtain coarse primary particles.

Coarse particles obtained from the aforesaid coarse primary particles so that the volume fractions of secondary particles became as shown in Table 7 about particles of 9 μm or more in mixed powders were mixed in appropriate amounts with the original samples to obtain the mixed powders.

The tap densities of the resulting mixed powders were examined similarly to Example 1, which are shown in Table 7.

Coin type batteries as shown in FIG. 3 were produced by use of the aforesaid mixed powders as the active materials of positive electrodes in a manner similar to Example 1. The first-time discharge capacity and the maintaining rates in the 100-time discharge capacity are shown together in Table 7.

TABLE 7

| Run No. | Number of Example 1 | Volume Fraction of Secondary Particles (%) | Tap Density g/cm³ | First-time Charge Capacity mAh/g | Maintaining Rate in Capacity (%) |
|---|---|---|---|---|---|
| 42 | 27 | 90 | 2.59 | 149 | 80 |
| 43 | 28 | 95 | 2.63 | 143 | 80 |
| 44 | 30 | 90 | 2.60 | 149 | 81 |
| 45 | 35 | 92 | 2.64 | 148 | 82 |

Comparative Example 1

The cobalt oxyhydroxide and lithium carbonate used in Example 1 were treated similarly to Example 1 except that the compositions and calcining conditions were as shown in Table 8, thus to obtain lithium cobaltate.

Coin type batteries were produced by use of the resulting lithium cobaltate as the active materials of positive electrodes and according to the measuring methods of Examples 1 and 2, the discharge capacity, the maintaining rates in the 100-time discharge capacity and the dependence of discharge capacity on discharging current density were examined, respectively, which are shown together in Table 8.

TABLE 8

| Run No. | Li/Co (Molar Ratio) | Calcining Temperature (° C.)/ hours | Atmosphere | First-time Discharge Capacity mAh/g | Maintaining Rate in Capacity (%) | Dependence on Discharging Current Density (%) |
|---|---|---|---|---|---|---|
| 46 | 0.95 | 950/4 | Air | 140 | 75 | 61 |
| 47 | 1.00 | 950/2 | Air | 138 | 65 | 62 |
| 48 | 1.05 | 850/12 | Air | 147 | 70 | 58 |
| 49 | 1.00 | 750/6 | Air | 135 | 71 | 53 |
| 50 | 1.00 | 1100/8 | Air | 133 | 63 | 50 |

Comparative Example 2

The cobalt oxyhydroxide and lithium carbonate used in Example 1 were precisely weighed so that Co and Li became 1:1 and calcined in air at 900° C. for 8 hours and lithium cobaltate was prepared in a manner similar to Example 1. Part of the resulting lithium cobalt was pulverized through a ball mill so that all particles became 6 μm or less. Subsequently, lithium cobaltate of the aforesaid ground powder and that of non-ground powder were thoroughly mixed so as to become 40:60 in weight ratio. The tap density of the aforesaid mixed powder was as insufficient as 2.0 grams/cm³. A coin type battery as shown in FIG. 3 was produced in a manner similar to Example 1 and the first-time discharge capacity and the maintaining rate in the 100-time discharge capacity were examined. The maintaining rate in capacity was 90 percent, but the first-time discharge capacity was as inferior as 135 mAh/g.

Comparative Example 3

The cobalt oxyhydroxide and the lithium carbonate used in Example 1 were precisely weighed so that Co and Li became 1:1 and calcined in air at 900° C. for 8 hours and lithium cobaltate (I) was prepared in a manner similar to Example 1. The volume fraction of the secondary particles in the resulting lithium cobaltate was 98 percent. Furthermore, after tricobalt tetraoxide comprising only primary particles having an average particle size of 5 μm and lithium carbonate were precisely weighed so that Co and Li became 1:1, they were calcined in air at 900° C. for 8 hours and lithium cobaltate (II) was prepared in a manner similar to Example 1.

In the resulting lithium cobaltate, sintering proceeded to form secondary particles and therefore, the secondary particles were pulverized until primary particles and the primary particles of 9 to 20 μm were collected with sieves.

The resulting primary particles and the aforesaid lithium cobaltate were well mixed in volume ratio of 10:90.

A coin type battery as shown in FIG. 3 was produced from the resulting mixture in a manner similar to Example 1. The first-time discharge capacity and the maintaining rate in the 100-time discharge capacity were examined. The first-time discharge capacity was 145 mAh/g; but the maintaining rate in discharge capacity was decreased to 73 percent.

Comparative Example 4

The oxyhydroxide comprising primary particles containing particle sizes of 0.2 to 0.8 μm as principal constituent particles and lithium carbonate were precisely weighed so that Co and Li became 1:1 and calcined at 900° C. for 8 hours in air and lithium cobaltate was prepared in a manner similar to Example 1.

In the resulting lithium cobaltate, the primary particles were sintered respectively to form secondary particles of uncertain shapes and of 0.4 to 10 μm. The tap density was as insufficient as 1.8 g/cm³.

Comparative Example 5

Tricobalt tetraoxide having an average particle size of 5 μm and lithium carbonate were precisely weighed so that Co and Li became 1:1, and calcined at 900° C. for 8 hours in air and lithium cobaltate was prepared in a manner similar to Example 1.

Since the resulting lithium cobaltate was strongly sintered to form firm granulates, it was pulverized with a centrifugal grinder and then the resulting particles were controlled in size with a 32-μm sieve.

The resulting size-controlled product was a mixed powder of primary particles and secondary particles having uncertain shapes and in the particle size distribution, had a broad distribution of 0.2 to 32 μm. The volume fraction of particles of 6 μm or more was 56 percent and the tap density was as insufficient as 2.1 g/cm³. A coin type battery as shown in FIG. 3 was produced in a manner similar to Example 1 and Example 2. The first-time discharge capacity and the maintaining rate in 100-time discharge capacity were found to be 138 mAh/g and 84 percent, respectively, but the dependence of discharge current on discharge current density was as inferior as 54 percent.

Comparative Example 6

Tricobalt tetraoxide having an average particle size of 5 μm and lithium carbonate were precisely weighed so that Co and Li became 1:1 and then calcined at 900° C. for 8 hours in air and lithium cobaltate was prepared in a manner similar to Example 1.

Since the resulting lithium cobaltate was strongly sintered to form firm granulates, it was pulverized through a centrifugal grinder and subsequently pulverized through a ball mill to primary particles of 10 μm or less. One weight percent of PVA and an appropriate amount of water were added to the amount of the resulting powder and stirred to make slurry.

The slurry was granulated by use of a spray dryer equipped with a multiblade-type disc of about 12-cm diameter under conditions of a disk revolution of 1000 rpm and a hot-air inlet temperature of 240° C. and the resulting granulates were controlled in size by use of a 32-μm sieve.

The size-controlled powder thus prepared was placed in a porcelain vessel and the temperature was raised at a speed of 150° C./hour until 600° C. while allowing air to pass through an electric furnace and maintained for 2 hours to vaporize thoroughly the PVA.

A coin type battery as shown in FIG. 3 was produced by use of the resulting lithium cobaltate granulates as an active material of a positive electrode in a manner similar to Example 1. The first-time discharge capacity and the maintaining rate in the 100-time discharge capacity were found to be 136 mAh/g and 78 percent, respectively, which were not sufficiently satisfactory values.

Comparative Example 7

Cobalt hydroxide $(Co(OH)_2)$ used in conventional techniques where spherical or elliptically spherical secondary particles falling in the range of 4 to 30 μm and formed by gathering of a number of primary particles of 0.2 to 0.8 μm were of principal particle forms and lithium carbonate $(Li_2CO_3)$ were precisely weighed so as to be 1:1 in ratio of Li and Co and calcined at 900° C. for 8 hours in air and lithium cobaltate was prepared in a manner similar to Example 1.

After the resulting lithium cobaltate was controlled in size with a 32-μm sieve, a coin type battery as shown in FIG. 3 was produced in a manner similar to Example 1. The first-time discharge capacity and the maintaining rate in the 100-time discharge capacity were examined, but were as inferior as 141 mAh/g and 77 percent, respectively.

As may be seen from the aforesaid examples and comparative examples, lithium cobaltate comprising a mixture of the small crystals falling in the range of 0.4 to 10 μm in Feret's diameter in a projection chart and having an average particle size of 5 μm or less and the spherical or elliptically spherical secondary particles falling in the range of 4 to 30 μm and formed by gathering of a number of the aforesaid small crystals, which are obtained by the process for the preparation of the invention, has a high tap density and accordingly, batteries can be filled with a large quantity of the active material of a positive electrode. This means increase in filling properties because the secondary particles filled tightly with the primary particles are spherical or elliptically spherical.

Use of this lithium cobaltate as the active material of a positive electrode is seen to be high in discharge capacity and also high in the maintaining rate in capacity. The reason for this is that the primary particles are comparatively small to enlarge the surface areas contacting with the electrolyte, which causes easily the battery reaction to increase the discharge capacity. Furthermore, the active material is hardly divided finely in spite of repeated charging and discharging to increase the maintaining rate in discharge capacity.

As may be seen from the aforesaid Example 2, the dependence on discharging current density also satisfactory. It is thought as the reason for this that in the lithium cobalt according to the invention, the primary particles are comparatively small and the surface areas contacting with the electrolyte are enlarged, which allows the battery reaction to occur easily. Furthermore, it also effectively contributes to the reason that since at least part of the primary particles are mutually jointed by sintering, the electric resistance between the primary particles decreases.

Furthermore, since the particles are strongly jointed, the secondary particles are scarcely crushed in the preparation of electrodes and inside voids are ensured to keep the permeability of electrolytes and in addition, dropping off of the primary particles from a current collector does not occur.

On the other hand, as may be seen from the comparative examples, simply granulated lithium cobaltate is not sufficient in electric contact among the primary particles to deteriorate performance of batteries. In addition, weak mechanical strength causes troubles of filling in the voids with the primary particles or dropping off from a current collector.

Industrial Applicability

As described above, the active material of a positive electrode of a non-aqueous secondary battery and the process for preparing the same of the invention enable improvement of secondary batteries in discharge capacity, maintaining rate in discharge capacity and high-efficiency discharge capacity and thereby, the preparation of excellent non-aqueous secondary batteries becomes possible.

What is claimed is:

1. An active material for a positive electrode of a non-aqueous electrolyte secondary battery comprising lithium cobaltate, $LiCoO_2$, the lithium cobaltate comprising a mixture of primary particles of small crystals falling in the range of 0.4 to 10 μm in Feret's diameter in a projection chart by SEM observation and having an average particle size of 5 μm or less and secondary spherical or elliptically spherical particles formed of agglomerated small crystals and falling in the range of 4 to 30 μm and in addition, the molar ratio of Co to Li being between 0.97 and 1.03, and wherein at least part of the small crystals constituting the secondary particles are sintered together.

2. An active material as described in claim 1, wherein the secondary particles account for 90 percent or more of particles of 9 μm or more in Feret's diameter in a projection chart by the aforesaid SEM observation.

3. An active material as described in claims 1 or 2 characterized in that the volume ratio of particles of 6 μm or more in Feret's diameter in a projection chart by the aforesaid SEM observation is 70 percent or more of the total mixture.

4. A positive electrode for a non-aqueous electrolyte secondary battery comprised of an active material comprising lithium cobaltate, $LiCoO_2$ wherein the lithium cobaltate comprises a mixture of primary particles of small crystals failing in the range of 0.4 to 10 μm in Feret's diameter in a projection chart by SEM observation and having an average particle size of 5 μm or less and secondary spherical or elliptically spherical particles formed of agglomerated small crystals and failing in the range of 4 to 30 μm and in addition, the molar ratio of Co to Li is between 0.97 and 1.03, and wherein at least part of the small crystals constituting the secondary particles are sintered together.

5. An active material for a positive electrode of a non-aqueous electrolyte secondary battery comprising lithium cobaltate, $LiCoO_2$, the lithium cobaltate comprising a mixture of primary particles of small crystals falling in the range of 0.4 to 10 μm in Feret's diameter in a projection chart by SEM observation and having an average particle size of 5 $\mu$m or less and secondary spherical or elliptically spherical particles formed of agglomerated small crystals and failing in the range of 4 to 30 $\mu$m and in addition, the molar ratio of Co to Li being between 0.97 and 1.03, and wherein at least part of the small crystals constituting the secondary particles are sintered together, and made by a process of agglomerating a number of said primary particles of 0.2 to 0.8 $\mu$m with a lithium salt to provide a mixture, and heat treating the mixture.

* * * * *